United States Patent [19]

Blanchet

[11] Patent Number: 5,287,771
[45] Date of Patent: Feb. 22, 1994

[54] MOUNTING FOR A DRIVE SHAFT, IN PARTICULAR FOR A WINDSHIELD WIPER DRIVE UNIT

[75] Inventor: Pierre Blanchet, Lencloitre, France

[73] Assignee: Valeo Systemes D'Essuyage, Montigny-Le-Bretonneux, France

[21] Appl. No.: 987,560

[22] Filed: Dec. 8, 1992

Related U.S. Application Data

[63] Continuation of Ser. No. 729,417, Jul. 12, 1991, abandoned.

[30] Foreign Application Priority Data

Jul. 16, 1990 [FR] France .................. 90 09018

[51] Int. Cl.⁵ .................................. F16H 57/04
[52] U.S. Cl. ................. 74/606 R; 15/250.3; 15/250.31; 15/250.04
[58] Field of Search .......... 74/606 R; 15/250.3, 15/250.31, 250.04, 103; 277/169, 188 R

[56] References Cited

U.S. PATENT DOCUMENTS

| | | | |
|---|---|---|---|
| 2,781,942 | 2/1957 | Eastburg | 220/46 |
| 2,895,158 | 7/1959 | Riester | 15/250.3 OR |
| 2,965,411 | 12/1960 | Makeca | 15/250.31 OR |
| 3,135,982 | 6/1964 | Carlisle | 15/250.3 |
| 4,216,624 | 8/1980 | Blankenburg et al. | 74/606 R X |
| 4,696,199 | 9/1987 | Fabbri | 74/606 R X |
| 4,922,570 | 5/1990 | Hirohama et al. | 15/250.04 X |
| 4,944,375 | 7/1990 | Ohta | 15/250.3 X |

FOREIGN PATENT DOCUMENTS

| | | |
|---|---|---|
| 0316831 | 5/1989 | European Pat. Off. . |
| 2700609 | 7/1978 | Fed. Rep. of Germany . |
| 2165540 | 8/1973 | France . |
| 2377553 | 8/1978 | France . |
| 2088707 | 6/1982 | United Kingdom . |

Primary Examiner—Leslie A. Braun
Assistant Examiner—Daniel Wittels
Attorney, Agent, or Firm—Wenderoth, Lind & Ponack

[57] ABSTRACT

A drive unit, for example for a windshield wiper, is of the type-including a casing containing a motor, a drive shaft extending through bearings and seal, the bearings and seal being mounted in a sleeve portion of the casing, and a speed reducing mechanism coupling the motor with the drive shaft. The anterior part of the sleeve portion includes a thickened portion having a bore of reduced radius, in which is formed the seat for the seal.

19 Claims, 1 Drawing Sheet ial thickness, i.e. having a smaller bore than the remainder of the
MOUNTING FOR A DRIVE SHAFT, IN PARTICULAR FOR A WINDSHIELD WIPER DRIVE UNIT This application is a continuation of now abandoned application, Ser. No. 07/729,417, filed Jul. 12, 1991, now abandoned.

FIELD OF THE INVENTION

This invention relates to a mounting for a drive shaft which is arranged to be driven in rotary or oscillating movement, and is intended in particular, though not exclusively, for the mounting of a drive shaft of a drive unit for a windshield wiper arm of a motor vehicle, the drive unit being of the kind comprising a motor and a speed reducing means coupling the motor with the drive shaft.

BACKGROUND OF THE INVENTION

It is well known that windshield wiper blades are driven in contact with the windshield of a motor vehicle, over a given sector of the latter and with a predetermined pressure, by means of a windshield wiper arm which is coupled to a drive unit having a motor that drives a speed reducing means, and which transforms the initial rotary movement of the motor directly or indirectly into alternating or oscillating motion of the drive shaft and wiper arm.

The drive unit conventionally has an electric motor, the rotor of which extends along the interior of a closed casing, the speed reducing means generally comprising a gearing system, with one of the gears being coupled, either directly or through a crank and connecting rod system, to the drive shaft which projects outside the casing of the drive unit, and which serves to actuate the windshield wiper arm.

As is again already known, the gear system carries, inter alia, on one of its toothed wheels, electrical contacts which enable the windshield wiper arm or arms to be selectively driven at variable speeds, and to be stopped, in such a way that the wipers will always be parked in a fixed lower position so as not to interfere with the visibility of the driver of the vehicle.

The drive shaft projects from the surface of the vehicle bodywork, and the presence of the above mentioned electrical contacts necessitates that the drive shaft must be mounted so that it is sealed from the ingress of water or impurities, so as to ensure that no short circuiting will occur within the drive unit. Such an arrangement is described in the specification of French published patent application No. FR 2 165 540A, in which the motor shaft is surrounded by a sleeve, the anterior portion of which (i.e. the portion remote from the speed reducing means) has an opening into which an O-ring seal can be introduced, together with a bearing comprising a ring of a material having a low coefficient of friction. The O-ring seal bears, at the side of the motor/speed reducing means, on a shoulder, and is retained opposite to the shoulder in an axial position by means of a member which is fitted at the front of the sleeve. This member is itself retained in the sleeve by means of a circlip or by any other similar retaining means.

Although such a mounting works very well in practice, it is relatively costly, in particular to the extent that it requires a substantial amount of machining, and also the fitting of an additional member which has to be retained in position by fastening or retaining means, which also have to be fitted and which increase manufacturing costs.

SUMMARY OF THE INVENTION

An object of the present invention is to overcome the above mentioned drawback and to facilitate fitting without a requirement for fitting additional components.

According to the invention, a mounting for a rotating or oscillating drive shaft in a sleeve member carried by a casing of a drive unit having at least one guide bearing and a sealing element disposed within the sleeve member, is characterised in that an anterior part of the sleeve, member includes a thickened portion having a bore of reduced diameter, with a seat for the sealing element being formed in a posterior part of such thickened portion.

Further features and advantages of the invention will appear more clearly from a reading of the description which follows, of a preferred embodiment of the invention, given by way of non-limiting example only and with reference to the accompanying drawings.

DESCRIPTION OF A PREFERRED EMBODIMENT OF THE INVENTION

Figure 1:
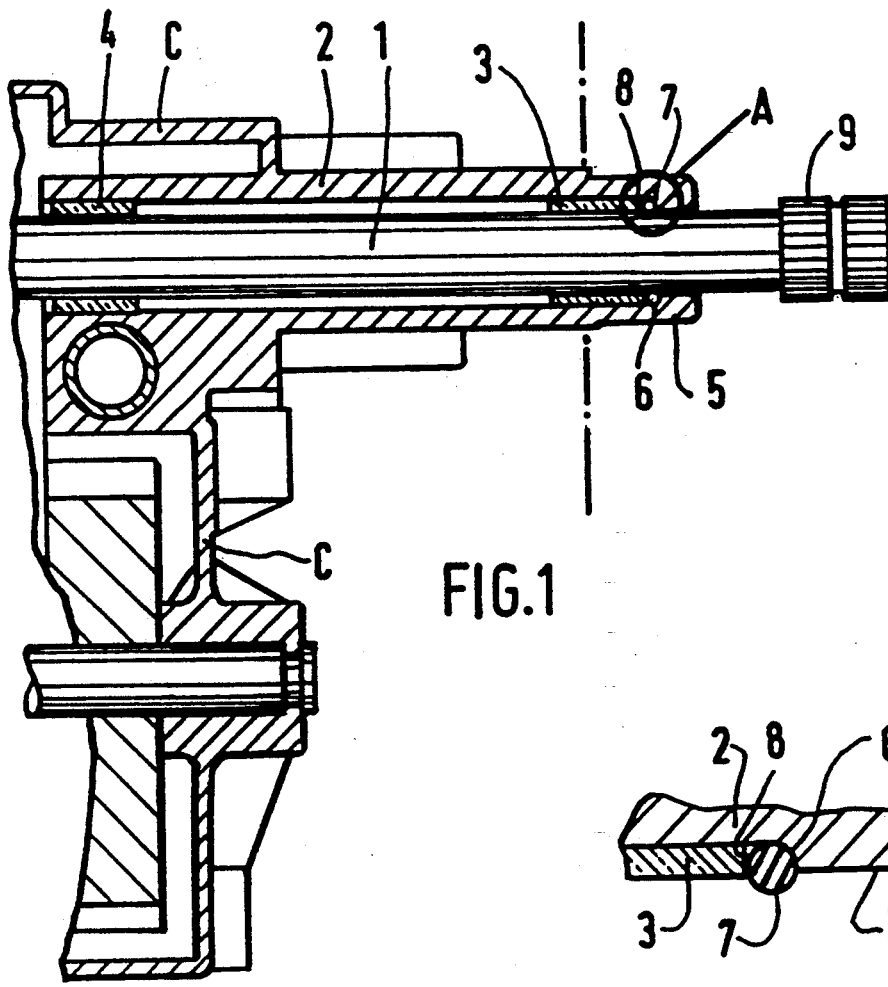
FIG. 1 is a partial cross section of a windshield wiper drive unit comprising a motor with a speed reducing facility, the power output side of the power unit being shown.

The windshield wiper drive unit shown in part in FIG. 1 comprises a casing C in which a motor and a speed reducing means are enclosed, these latter being of known type. The power unit has an output shaft 1 for driving a windshield wiper arm (not shown), or for driving a motion transmission device of the coupling rod type (again not shown). In particular, FIG. 1 shows a mounting for the drive shaft 1. The drive shaft 1 projects outwardly from the bodywork of a vehicle, which is indicated diagrammatically in FIG. 1 by a vertical phantom line.

In this description, the adjective "anterior" relates to components or portions which are disposed towards the outside of the drive unit, while the adjective "posterior" relates to those which are closer to the motor and speed reducing means.

The shaft 1 is surrounded by a sleeve member or portion 2, within which an anterior bearing 3 and a posterior bearing 4 are mounted. The bearings 3 and 4 may for example consist of simple rings of nylon or polytetrafluoroethylene, and act as guide bearings for the drive shaft 1.

Figure 2:
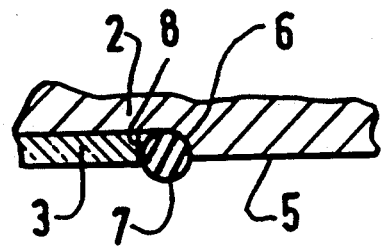
FIG. 2 is a partial view on a larger scale showing the portion indicated within the circle indicated at A in FIG. 1.
Figure 4:
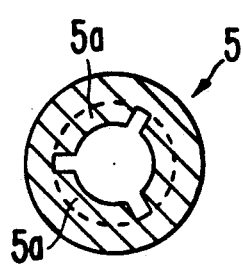
FIG. 4 is a transverse section through a thickened portion of a sleeve of the unit and showing a specific embodiment of such portion.

The anterior part of the sleeve portion 2 includes a terminal portion or element 5 of increased radial thickness, i.e. having a smaller bore than the remainder of the sleeve portion 2. The terminal or thickened portion 5 may be circumferentially continuous, or it may consist of a plurality of circumferential sectors for example three sectors 5a disposed at 120° from each other as shown in FIG. 4). A seat 6, for a sealing member 7, which is preferably in the form of an O-ring, is formed in the posterior part of the terminal portion 5. As is best seen in FIG. 2, the sealing element 7, engaged on seat 6, is located in the axial sense partly by the latter seat 6 and partly by the anterior end 8 of the bearing 3. In the form shown in FIG. 2, the seat 6 consists of a substantially circular groove having a configuration such that, firstly, the radial dimension or diameter of the circular groove coincides with the internal diameter of the portion of the bore in which the bearing 3 is fitted, and secondly, the groove is open in its posterior part (i.e. facing towards the bearing 3), in such a way that the axial cross section of the groove has the shape of a quarter of a circle.

Figure 3:
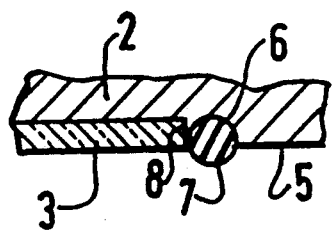
FIG. 3 is a view similar to FIG. 2, but showing a modification.

In the modified arrangement shown in FIG. 3, the seat 6 is substantially in the form of a semi-circular groove which is formed in the end of the posterior part of the terminal portion 5. The posterior free end of the terminal portion 5 acts as an axial abutment surface for the bearing 3, so as to protect the sealing element 7 from being accidentally disturbed or crushed by the bearing 3.

The internal diameter of the terminal portion 5 is of course slightly greater than the internal diameter of the bearings 3 and 4, while the internal diameter of the sealing element 7 is slightly smaller than the outer diameter of the drive shaft 1. In the conventional way, the drive shaft 1 is extended by a knurled head 9 which is designed to be coupled directly or indirectly to one or more windshield wiper arms, or to a drive linkage for windshield wipers. The sleeve portion 2 is preferably molded with the casing or housing C of the drive unit.

The drive shaft 1 is fitted as follows. Before the shaft 1 is introduced, the sealing element 7, the bearing 3, and the bearing 4 are first fitted in that order into the interior of the sleeve portion 2. The shaft 1 can then be slid into the sleeve portion, and the assembly is ready to operate.

Using this arrangement, machining of the means whereby the drive shaft is mounted in the drive unit is reduced, and fitting is particularly simple. A number of modifications may of course be made, in particular by substitution of equivalent elements where appropriate, without departing from the scope of the present invention.

What is claimed is:

1. A drive unit comprising:
a casing including a sleeve member having therethrough an axial bore;
a drive shaft extending through said bore;
a motor and speed reduction mechanism mounted in said casing and coupled to said drive shaft for imparting thereto rotary or oscillating motion;
at least one bearing mounted in said sleeve member for supporting said drive shaft and guiding said drive shaft during said motion thereof;
a seal mounted in said sleeve member and sealing against said drive shaft;
said sleeve member having a posterior part relatively closer to said casing and an anterior part relatively further from said casing, said bore through said sleeve member including a reduced diameter section at said anterior part, thereby defining a thickened portion of said sleeve member at said anterior part; and
said thickened portion of said sleeve member having a posterior portion having defined therein a seat within which seats said seal, with said seal being positioned axially between said bearing and said thickened portion, and with said bearing maintaining said seal seated on said sheet.

2. A drive unit as claimed in claim 1, wherein said seat is defined by a surface that is curved in axial cross section.

3. A drive unit as claimed in claim 2, wherein said surface has a configuration of a quarter of a circle in axial cross section.

4. A drive unit as claimed in claim 1, wherein said thickened portion is circumferentially continuous.

5. A drive unit as claimed in claim 1, wherein said thickened portion comprises plural circumferentially spaced sectors.

6. A drive unit as claimed in claim 1, wherein said thickened portion has an internal diameter greater than that of said bearing.

7. A drive unit comprising:
a casing including a sleeve member having therethrough an axial bore;
a drive shaft extending through said bore;
a motor and speed reduction mechanism mounted in said casing and coupled to said drive shaft for imparting thereto rotary or oscillating motion;
at least one bearing mounted in said sleeve member for supporting said drive shaft and guiding said drive shaft during said motion thereof;
a seal mounted in said sleeve member and sealing against said drive shaft;
said sleeve member having a posterior part relatively closer to said casing and an anterior part relatively further from said casing, said bore through said sleeve member including a reduced diameter section at said anterior part, thereby defining a thickened portion of said sleeve member at said anterior part; and
said thickened portion of said sleeve member having a posterior portion having defined therein a seat within which seats said seal, with said seal being positioned axially between said bearing and said thickened portion, said posterior portion of said thickened portion terminating in an abutment surface against which abuts said bearing.

8. A drive unit as claimed in claim 7, wherein said seat is defined by a surface that is curved in axial cross section.

9. A drive unit as claimed in claim 8, wherein said surface has substantially a semi-circular configuration in axial cross section.

10. A drive unit as claimed in claim 7, wherein said thickened portion is circumferentially continuous.

11. A drive unit as claimed in claim 7, wherein said thickened portion comprises plural circumferentially spaced sectors.

12. A drive unit as claimed in claim 7, wherein said abutment surface extends radially.

13. A drive unit as claimed in claim 7, wherein said thickened portion has an internal diameter greater than that of said bearing.

14. A drive unit comprising:
a casing including a sleeve member having therethrough an axial bore;
a drive shaft extending through said bore;
a motor and speed reduction mechanism mounted in said casing and coupled to said drive shaft for imparting thereto rotary or oscillating motion;

at least one bearing mounted in said sleeve member for supporting said drive shaft and guiding said drive shaft during said motion thereof;

a seal mounted in said sleeve member and sealing against said drive shaft;

said sleeve member having a posterior part relatively closer to said casing and an anterior part relatively further from said casing, said bore through said sleeve member including a reduced diameter section at said anterior part, thereby defining a thickened portion of said sleeve member at said anterior part; and said thickened portion of said sleeve member having a posterior portion having defined therein a seat within which seats said seal, with said seal being positioned axially between said bearing and said thickened portion, said thickened portion having an internal diameter greater than that of said bearing.

15. A drive unit as claimed in claim 14, wherein said seat is defined by a surface that is curved in axial cross section.

16. A drive unit as claimed in claim 15, wherein said surface has substantially a semi-circular configuration in axial cross section.

17. A drive unit as claimed in claim 15, wherein said surface has a configuration of a quarter of a circle in axial cross section.

18. A drive unit as claimed in claim 14, wherein said thickened portion is circumferentially continuous.

19. A drive unit as claimed in claim 14, wherein said thickened portion comprises plural circumferentially spaces sectors.

* * * * *